(12) United States Patent
Rose

(10) Patent No.: US 8,063,657 B2
(45) Date of Patent: Nov. 22, 2011

(54) SYSTEMS AND DEVICES FOR QUANTUM PROCESSOR ARCHITECTURES

(75) Inventor: Geordie Rose, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 194 days.

(21) Appl. No.: 12/483,971

(22) Filed: Jun. 12, 2009

(65) Prior Publication Data

US 2009/0321720 A1    Dec. 31, 2009

Related U.S. Application Data

(60) Provisional application No. 61/061,333, filed on Jun. 13, 2008.

(51) Int. Cl.
*H03K 19/195* (2006.01)
*H01L 25/00* (2006.01)
(52) U.S. Cl. .......... 326/5; 326/41; 326/47; 326/101
(58) Field of Classification Search .......... 326/5, 37–41, 326/47, 101
See application file for complete search history.

(56) References Cited

U.S. PATENT DOCUMENTS

| | | | |
|---|---|---|---|
| 7,135,701 B2 | 11/2006 | Amin et al. | |
| 7,533,068 B2 * | 5/2009 | van den Brink et al. | 706/10 |
| 7,932,515 B2 * | 4/2011 | Bunyk | 257/31 |
| 2006/0225165 A1 | 10/2006 | van den Brink et al. | |
| 2008/0176750 A1 | 7/2008 | Rose et al. | |
| 2009/0173936 A1 * | 7/2009 | Bunyk | 257/31 |
| 2010/0281885 A1 * | 11/2010 | Black et al. | 62/46.1 |

OTHER PUBLICATIONS

U.S. Appl. No. 12/266,378, filed Nov. 6, 2008 in the name of Vicky Choi, 38 pages.
PCT Application No. PCT/US2009/37984, filed Mar. 23, 2009 in the name of Paul Bunyk et al., 62 pages.

* cited by examiner

*Primary Examiner* — Shawki Ismail
*Assistant Examiner* — Thienvu Tran
(74) *Attorney, Agent, or Firm* — Seed IP Law Group PLLC

(57) ABSTRACT

A quantum processor may employ a heterogeneous qubit-coupling architecture to reduce the average number of intermediate coupling steps that separate any two qubits in the quantum processor, while limiting the overall susceptibility to noise of the qubits. The architecture may effectively realize a small-world network where the average qubit has a low connectivity (thereby allowing it to operate substantially quantum mechanically) but each qubit is within a relatively low number of intermediate coupling steps from any other qubit. To realize such, some of the qubits may have a relatively high connectivity, and may thus operate substantially classically.

19 Claims, 6 Drawing Sheets

SYSTEMS AND DEVICES FOR QUANTUM PROCESSOR ARCHITECTURES

CROSS REFERENCE TO RELATED APPLICATIONS

This application claims benefit under 35 U.S.C. 119(e) of U.S. Provisional Patent Application Ser. No. 61/061,333, filed Jun. 13, 2008 and entitled "Systems and Devices for Quantum Processor Architectures," which is incorporated herein by reference in its entirety.

BACKGROUND

Field

This disclosure generally relates to architectures for quantum processor topologies, and specifically relates to heterogeneous architectures for superconducting processor topologies.

Superconducting Qubits

There are many different hardware and software approaches under consideration for use in quantum computers. One hardware approach employs integrated circuits formed of superconducting material, such as aluminum and/or niobium, to define superconducting qubits. Superconducting qubits can be separated into several categories depending on the physical property used to encode information. For example, they may be separated into charge, flux and phase devices. Charge devices store and manipulate information in the charge states of the device; flux devices store and manipulate information in a variable related to the magnetic flux through some part of the device; and phase devices store and manipulate information in a variable related to the difference in superconducting phase between two regions of the phase device.

Many different forms of superconducting flux qubits have been implemented in the art, but all successful implementations generally include a superconducting loop (i.e., a "qubit loop") that is interrupted by at least one Josephson junction. Some embodiments implement multiple Josephson junctions connected either in series or in parallel (i.e., a compound Josephson junction) and some embodiments implement multiple superconducting loops.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, US Patent Publication 2008-0176750, U.S. patent application Ser. No. 12/266,378, and PCT Patent Application Serial No. PCT/US09/37984.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems, methods, and apparatus, an "adiabatic" evolution is considered to be an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly. It is known that the solution to a hard problem, such as a combinatorial optimization problem, may be encoded in the ground state of a system Hamiltonian and therefore quantum annealing may be used to find the solution to such hard problems. Adiabatic quantum computation is a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing is an algorithm that uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in a local minimum close to the exact solution; the slower the evolution, the better the solution that will be achieved. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

BRIEF SUMMARY

At least one embodiment may be summarized as quantum processor, including a plurality of qubits, each of the qubits in the plurality of qubits communicatively coupleable to at least one other qubit in the plurality of qubits, where: a number of outermost ones of the plurality of qubits form a perimeter of the plurality of qubits, and a number of inner ones of the plurality of qubits form an interior of the plurality of qubits, the inner ones of the plurality of qubits spaced inwardly from the outermost ones of the plurality of qubits, a first set of the number of inner ones of the plurality of qubits having a first connectivity, and a second set of the number of inner ones of the plurality of qubits having a second connectivity, the second connectivity greater than the first connectivity.

The second connectivity may be sufficiently high that at least some of the qubits of the second set of the number of inner ones of the qubits operate substantially classically. The first connectivity may be sufficiently low that at least some of the qubits of the first set of the number of inner ones of the qubits operate substantially quantum mechanically. The first connectivity may be sufficiently low that at least some of the qubits of the first set of the number of inner ones of the qubits operate substantially quantum mechanically.

The quantum processor may include a plurality of couplers, each of the couplers operable to couple respective pairs of the qubits. Respective pairs of the qubits may be spaced with respect to one another to provide communicative coupling therebetween with or without the use of a coupler. The quantum processor may be a superconducting quantum processor and at least one qubit may be selected from the group consisting of: a superconducting flux qubit, a superconducting phase qubit, a superconducting charge qubit, and a superconducting hybrid qubit. At least some of the plurality of qubits may form a small-world network. The quantum processor may include an additional plurality of qubits, at least one of the qubits of the additional plurality of qubits spaced outwardly from an outermost one of the plurality of qubits. At least one qubit from the additional plurality of qubits may have a connectivity that is greater than the first connectivity.

At least one embodiment may be summarized as a quantum processor, including a plurality of qubits, each of the qubits in the plurality of qubits communicatively coupleable to at least one other qubit in the plurality of qubits, where: each of the qubits of the plurality of qubits form a perimeter without any additional qubits within an interior of the perimeter, a first set of the qubits of the plurality of qubits having a first connectivity, a second set of the qubits of the plurality of qubits having a second connectivity, the second connectivity greater than the first connectivity.

The first connectivity may be sufficiently low that at least some of the qubits of the first set of qubits operate substantially quantum mechanically. The second connectivity may be sufficiently high that at least some of the qubits of the second set of qubits operate substantially classically. The second connectivity may be sufficiently high that at least some of the qubits of the second set of qubits operate substantially classically.

The quantum processor may take the form of a plurality of couplers operable to couple respective pairs of the qubits. The quantum processor may take the form of a plurality of couplers, each of the couplers operable to selectively couple respective pairs of the qubits. Respective pairs of the qubits may be spaced with respect to one another to provide communicative coupling therebetween without the use of a coupler. The quantum processor may be a superconducting quantum processor and at least one qubit may be selected from the group consisting of: a superconducting flux qubit, a superconducting phase qubit, a superconducting charge qubit, and a superconducting hybrid qubit. At least some of the plurality of qubits may form a small-world network.

At least one embodiment may be summarized as a quantum processor, including a plurality of qubits, each qubit communicably coupleable to at least one other qubit, and wherein: a first set of the plurality of qubits that includes at least one qubit, where each qubit in the first set is communicatively coupleable to each nearest neighbor qubit and to each next-nearest neighbor qubit; and a second set of qubits that includes at least one qubit, where each qubit in the second set is communicatively coupleable to each nearest neighbor qubit, each next-nearest neighbor qubit as well as at least one additional qubit, the qubits of the second set of qubits each having a connectivity greater than a connectivity of any of the qubits of the first set of qubits, and wherein at least one qubit in the first set of qubits is communicably coupleable to at least one qubit in the second set of qubits.

The qubits of the first set of qubits may each have a respective connectivity that is sufficiently low that each of the qubits of the first set of qubits operate substantially quantum mechanically. The qubits of the second set of qubits may each have a respective connectivity that is sufficiently high that each of the qubits of the second set of qubits operate substantially classically. At least one qubit may be selected from the group consisting of: a superconducting flux qubit, a superconducting phase qubit, a superconducting charge qubit, and a superconducting hybrid qubit.

At least one embodiment may be summarized as a method of providing a quantum processor, including providing on a substrate a first set of qubits with a low connectivity N that is an integer, where each qubit in the first set of qubits is spaced inwardly of an outermost perimeter set of qubits and behaves substantially quantum mechanically; and providing on the substrate a second set of qubits with a high connectivity M that is greater than the low connectivity N of the qubits of the first set of qubits, wherein at least one qubit from the first set of qubits is communicatively coupleable to at least one qubit from the second set of qubits.

Providing on a substrate a first set of qubits with a low connectivity may include, for each qubit in the first set of qubits, providing couplers between the qubit and a set of at most N other qubits. Providing on the substrate a second set of qubits with a high connectivity may include, for each qubit in the second set of qubits, providing couplers between the qubit and a set of at least M other qubits. Providing a first set of qubits with a low connectivity may include, for each qubit in the first set of qubits, providing couplers between the qubit and at least one of each nearest neighbor and next next-nearest neighbor qubits, and providing a second set of qubits with a high connectivity may include, for each qubit in the second set of qubits, providing couplers between the qubit and a set of nearest neighbor and next-nearest neighbor qubits and between the qubit and at least one qubit in addition to the nearest neighbor and next-nearest neighbor qubits. Providing a first set of qubits with a low connectivity may include, for each qubit in the first set of qubits, spacing a set of N other qubits sufficiently proximate the qubit to communicatively couple therewith. Providing a second set of qubits with a high connectivity may include, for each qubit in the second set of qubits, spacing a set of M other qubits sufficiently proximate the qubit to communicatively couple therewith.

At least one embodiment may be summarized as a method of providing a quantum processor, including providing on a substrate a first set of qubits with a low connectivity N that is an integer, where each qubit in the first set of qubits form part of a perimeter set of qubits without any additional qubits within an interior of the perimeter and the qubits of the first set of qubits each behaves substantially quantum mechanically; and providing on the substrate a second set of qubits with a high connectivity M that is greater than the low connectivity N of the qubits of the first set of qubits, wherein each qubit of the second set of qubits is communicatively coupleable to at least one qubit from the second set of qubits.

Providing on a substrate a first set of qubits with a low connectivity may include, for each qubit in the first set of qubits, providing couplers between the qubit and at most a set of next-nearest neighbor qubits. Providing on the substrate a second set of qubits with a high connectivity may include, for each qubit in the second set of qubits, providing couplers between the qubit and a set of nearest neighbor qubits, a set of next-nearest neighbor qubits, and at least one other qubit. Providing a first set of qubits with a low connectivity may include, for each qubit in the first set of qubits, providing couplers between the qubit and at least one of each nearest neighbor and next next-nearest neighbor qubits, and wherein providing a second set of qubits with a high connectivity may include, for each qubit in the second set of qubits, providing couplers between the qubit and a set of nearest neighbor and next-nearest neighbor qubits and between the qubit and at least one qubit in addition to the nearest neighbor and next-nearest neighbor qubits. Providing a first set of qubits with a low connectivity may include, for each qubit in the first set of qubits, spacing at most a set of nearest neighbor and next-nearest neighbor qubits sufficiently proximate the qubit to communicatively couple therewith. Providing a second set of qubits with a high connectivity may include, for each qubit in the second set of qubits, spacing a set of nearest neighbor and next nearest neighbor qubits and at least one other qubit sufficiently proximate the qubit to communicatively couple therewith.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION OF THE INVENTION

Figure 1A:
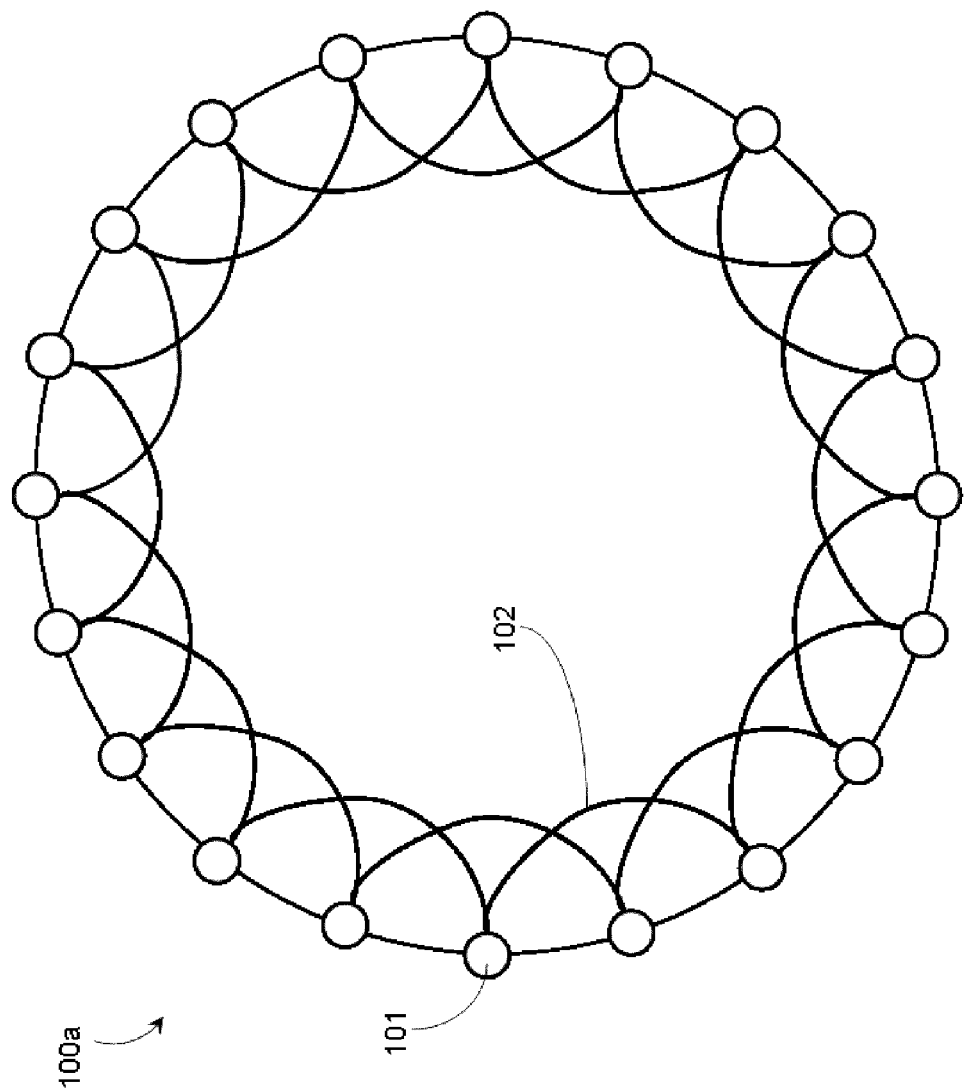
FIG. 1A is an illustrative representation of an embodiment of a homogenous architecture for a quantum processor.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with quantum processors, such as quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The present systems and devices generally describe new architectures for quantum processors. In particular, the present systems and devices describe new architectures for superconducting quantum processors comprising a variety of qubits, some of which may be designed to have low connectivity and behave quantum mechanically, some of which may be designed to have high connectivity and behave more classically, and some of which may operate in an intermediate regime. Those of skill in the art will appreciate that the principles taught herein may be applied to other forms of quantum processors, such as semiconductor quantum processors and quantum processors incorporating quantum dots, and are not limited to applications with superconducting quantum processors.

In designing an architecture for a quantum processor, a variety of factors may be considered. Of particular relevance to the present systems and devices is the concept of qubit connectivity. In order for a quantum processor to perform sophisticated quantum computations, at least some of the qubits must be interconnected such that information (i.e., classical information and/or quantum information) may be shared therebetween. The architecture of a quantum processor may be heavily influenced by these qubit interconnections. For example, in some designs each qubit may be configured to be communicatively coupleable (e.g., selectively or non-selectively) to no more than two other qubits without any intervening qubits. In other designs, each qubit may be configured to be communicatively coupleable (e.g., selectively or non-selectively) to more than two other qubits without any intervening qubits. For example, in some designs the qubits may be arranged in a lattice and each qubit may be configured to be communicatively coupleable to its nearest neighbors and/or next-nearest neighbors in the lattice, without the use of any intervening qubits. Throughout this specification and the appended claims, the "connectivity" of a qubit refers to the maximum number of possible communicative coupling paths that are available (e.g., whether active or not) to communicably couple the qubit to other qubits without the use of intervening qubits. For example, a qubit with a connectivity of three is capable of communicably coupling to up to three other qubits without any intervening qubits. In some embodiments, a qubit may be communicatively coupleable to another qubit without any intervening qubits via a direct communicative coupling (e.g., flux) between the first and second qubits, without any intervening devices (e.g., couplers), for instance if portions of the first and second qubits are spaced sufficiently close together to transfer flux therebetween. In some embodiments, a qubit may be communicatively coupled to another qubit without any intervening qubits via an indirect communicative coupling (e.g., coupler) between the first and the second qubits.

The interconnections between qubits in a quantum processor may influence the type and complexity of problems that are solvable with the quantum processor. In general, the higher the connectivity the more elaborate or complicated the problems that may be solved using the quantum processor. Many real-world problems are modeled more accurately on an architecture with high connectivity than on an architecture with low connectivity. Thus, in many applications it may be desirable to implement a quantum processor architecture that incorporates a high level of connectivity so that more sophisticated problems may be solved.

Unfortunately, there are consequences to implementing an architecture that incorporates a high level of connectivity. Specifically, when a first qubit is coupled to a second qubit, the level of "noise" that is seen by both qubits increases. For example, noise from the first qubit may be coupled to the second qubit, and, in some embodiments, noise may also be coupled to the second qubit from an intermediate coupling device. As the level of connectivity of the architecture increases, so too may the level of noise that is seen by each qubit. The performance of quantum computation is typically highly sensitive to noise. In the presence of noise, the ability to harness quantum effects, such as superposition and entanglement, for the purposes of computation may be diminished. For example, noise can cause discrete energy levels to broaden to the point where the energy levels overlap, resulting in a classical continuum of energy. Thus, a noisy qubit may behave more like a classical bit than a quantum bit. For this reason, there is incentive to reduce noise in a quantum processor and this may be accomplished, at least in part, by incorporating a low level of connectivity into the qubit-coupling architecture.

Clearly, qubit connectivity has an important influence on the performance and capability of a quantum processor. On the one hand, increased connectivity allows more sophisticated problems to be solved. On the other hand, reduced connectivity helps to isolate each qubit from noise that could otherwise be detrimental to the performance of the quantum processor. In previous considerations of this tradeoff, a balance is sought and an architecture based on a substantially homogeneous intermediate level of connectivity is designed. In accordance with the present systems and devices, embodiments of heterogeneous quantum processors are described in which qubits of different connectivities are incorporated into a single architecture. In some embodiments, a quantum processor may include both classical and quantum devices in the same architecture, where the classical/quantum nature of a device may be influenced by the level of connectivity thereto/therefrom.

FIG. 1A is an illustrative representation of an embodiment of a homogenous architecture for a quantum processor $100a$. Processor $100a$ includes twenty vertices (collectively 101, only one called out in the Figure), where each vertex 101 is connected to four other vertices by a set of edges (collectively 102, only one called out in the Figure). In some embodiments, each of vertices 101 may represent a respective qubit and each of edges 102 may represent a respective coupling between qubits which may be realized directly or through a coupling device. In other embodiments, each of edges 102 may represent a respective qubit and each of vertices 101 may represent a respective coupling between qubits which may be realized directly or through a coupling device. The circular layout of processor $100a$ is used for illustrative purposes only and a similar coupling scheme (each vertex being configured to couple to four other vertices) may be realized using a variety of layout geometries, including square grids, rectangular grids, triangular layouts, and layouts of irregular shape. The purpose of FIG. 1A is to illustrate a homogenous processor architecture, where each vertex is coupled to the same number of other vertices. The connectivity of four is used only as an example in FIG. 1A, while any connectivity greater than or equal to two could similarly be used in a homogenous processor architecture.

Figure 1B:
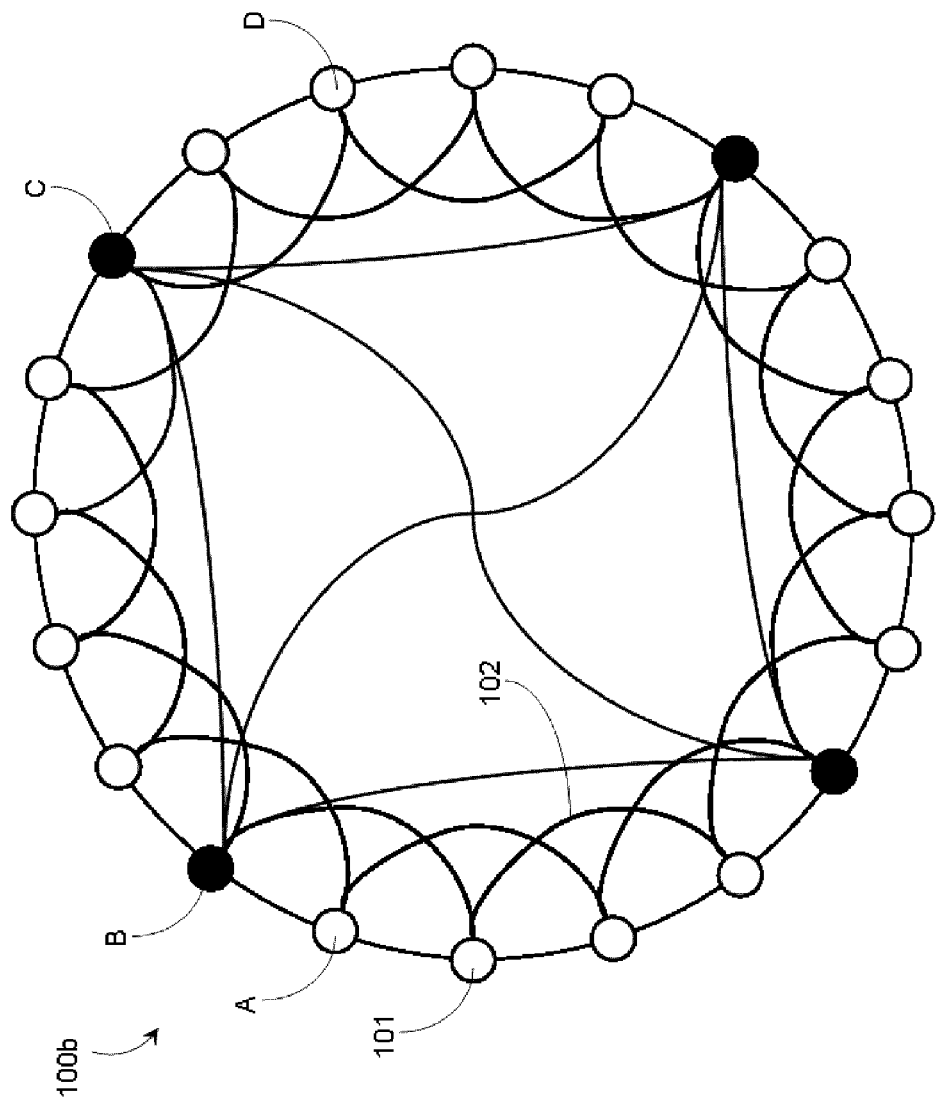
FIG. 1B is an illustrative representation of an embodiment of a heterogeneous architecture for a quantum processor.

In accordance with the present systems and devices, embodiments of heterogeneous architectures are described. FIG. 1B is an illustrative representation of an embodiment of a heterogeneous architecture for a quantum processor $100b$. Processor $100b$ includes twenty vertices (collectively 101, only one called out in the Figure), where each vertex 101 is connected to at least four other vertices by a set of edges (collectively 102, only one called out in the Figure). In some embodiments, each of vertices 101 may represent a respective qubit and each of edges 102 may represent a respective coupling between qubits which may be realized directly or through a coupling device. In other embodiments, each of edges 102 may represent a respective qubit and each of vertices 101 may represent a respective coupling between qubits which may be realized directly or through a coupling device. The set of twenty vertices 101 includes sixteen vertices (shown as white circles in the Figure) that are each configured to couple to four other vertices in a similar way to that shown for processor 100a in FIG. 1A. However, unlike processor 100a, processor 100b includes four vertices (shown as black circles in the Figure) that are each configured to couple to seven other vertices. Processor 100b is heterogeneous because the architecture involves non-uniform connectivity.

The non-uniform connectivity in processor 100b may be implemented to reduce the degree of separation between vertices. For example, in processor 100a, vertices that are at opposite sides of the layout are only communicably coupled by sequentially coupling a signal through up to five other vertices. Conversely, in processor 100b no qubit is more than three intermediate coupling steps away from any other qubit. Throughout this specification and the appended claims, the term "intermediate coupling" is used to refer to indirect communicative coupling between a first qubit and a second qubit where the communication is coupled through a sequence of communicably coupled intermediate qubits to which the first qubit is communicably coupled at a first end and the second qubit is communicably coupled at a second end. For example, in processor 100b, qubit A may be communicably coupled to qubit D by intermediate coupling through qubits B and C. Throughout this specification and the appended claims, the term "intermediate coupling step" refers to any one communicative coupling in a sequence of intermediate coupling. For example, in processor 100b the intermediate coupling between qubits A and D through qubits B and C is achieved by a sequence of three intermediate coupling steps: intermediate coupling from qubit A to qubit B, intermediate coupling from qubit B to qubit C, and intermediate coupling from qubit C to qubit D.

In some embodiments of heterogeneous processor 100b, each of the twenty vertices 101 represents either a quantum device or a classical device. For example, vertices that are connected to no more than four other vertices (e.g., white circles in FIG. 1B) may have connectivity that is sufficiently low to permit these vertices to operate quantum mechanically (i.e., as qubits). On the other hand, vertices that are connected to seven other vertices (e.g. black circles in FIG. 1B) may have such high connectivity that the level of noise that is coupled into these vertices forces them to behave classically. Throughout this specification and the appended claims, the term "qubit" is used generally to refer to an individual bit of a quantum processor. The various embodiments described herein provide heterogeneous quantum processor architectures in which the connectivity of at least one qubit may be sufficiently high so as to cause that qubit to behave substantially classically. However, for the purposes of the present systems and devices, a qubit which behaves substantially classically as a result of high connectivity is still referred to as a qubit because the device itself may be substantially similar in structure to the other qubits in the processor architecture.

The circular layout of processor 100b is used for illustrative purposes only and a similar coupling scheme (each vertex being configured to couple to at least four other vertices) may be realized using a variety of layout geometries, including square grids, rectangular grids, triangular layouts, and layouts of irregular shape. The purpose of FIG. 1B is to illustrate a heterogeneous processor architecture, where the connectivity is not uniform among all vertices. The connectivities of four and seven are used only as examples in FIG. 1B, while the actual correlation between connectivity and quantum vs. classical behavior may depend on the specific systems and devices being implemented.

The "connectivity" of a qubit may be interpreted as the number of couplings (either direct couplings or couplings through coupling devices) to/from the qubit. As the connectivity increases, the level of noise that is coupled into the qubit through these couplings can make quantum manipulations of the qubit more difficult, causing it to behave more like a classical bit than a qubit (or "quantum bit"). In practice, there may not be a specific "connectivity threshold" at which a qubit switches between classical and quantum behavior. Indeed, it may be possible for a qubit to operate in a regime where its behavior is in some ways classical and in some ways quantum. In accordance with the present systems and devices, a heterogeneous processor architecture may be implemented in which the majority of qubits have a connectivity that is low enough to allow them to behave substantially quantum mechanically, but a small percentage of qubits have a higher connectivity to reduce the average number of coupling steps between qubits. The small percentage of qubits with higher connectivity may, in some embodiments, behave substantially classically, or operate in a regime where the behavior is part quantum mechanical and part classical. As previously described, throughout this specification and the appended claims, the term "qubit" is used loosely to refer to an individual bit of a quantum processor. For the purposes of the present systems and devices, it is the connectivity of such a qubit that may influence whether it behaves substantially quantum mechanically, substantially classically, or in an intermediate regime.

In accordance with the present systems and devices, the architecture of a quantum processor may be advantageously designed to effectively realize a small-world network between qubits. In a small-world network, most nodes are not neighbors of one another and are not directly coupled to one another; however, most nodes may be reached by a small number of intermediate steps through the couplings of other nodes. Small-world networks are prevalent throughout nature and society (for example: road maps, food chains, electric power grids, social influence networks, flight routes between airports, etc.) and it may therefore be advantageous to emulate a small-world network in the architecture of a quantum processor. In particular, an analog quantum processor, such as an adiabatic quantum processor or a quantum processor designed to implement quantum annealing, may better model applications that involve small-world networks if the processor itself includes a small-world network. In such an example, the nodes of the small-world network may be realized by the qubits of the quantum processor, or by the couplings within the quantum processor, depending on which embodiment best models the particular problem.

Figure 2A:
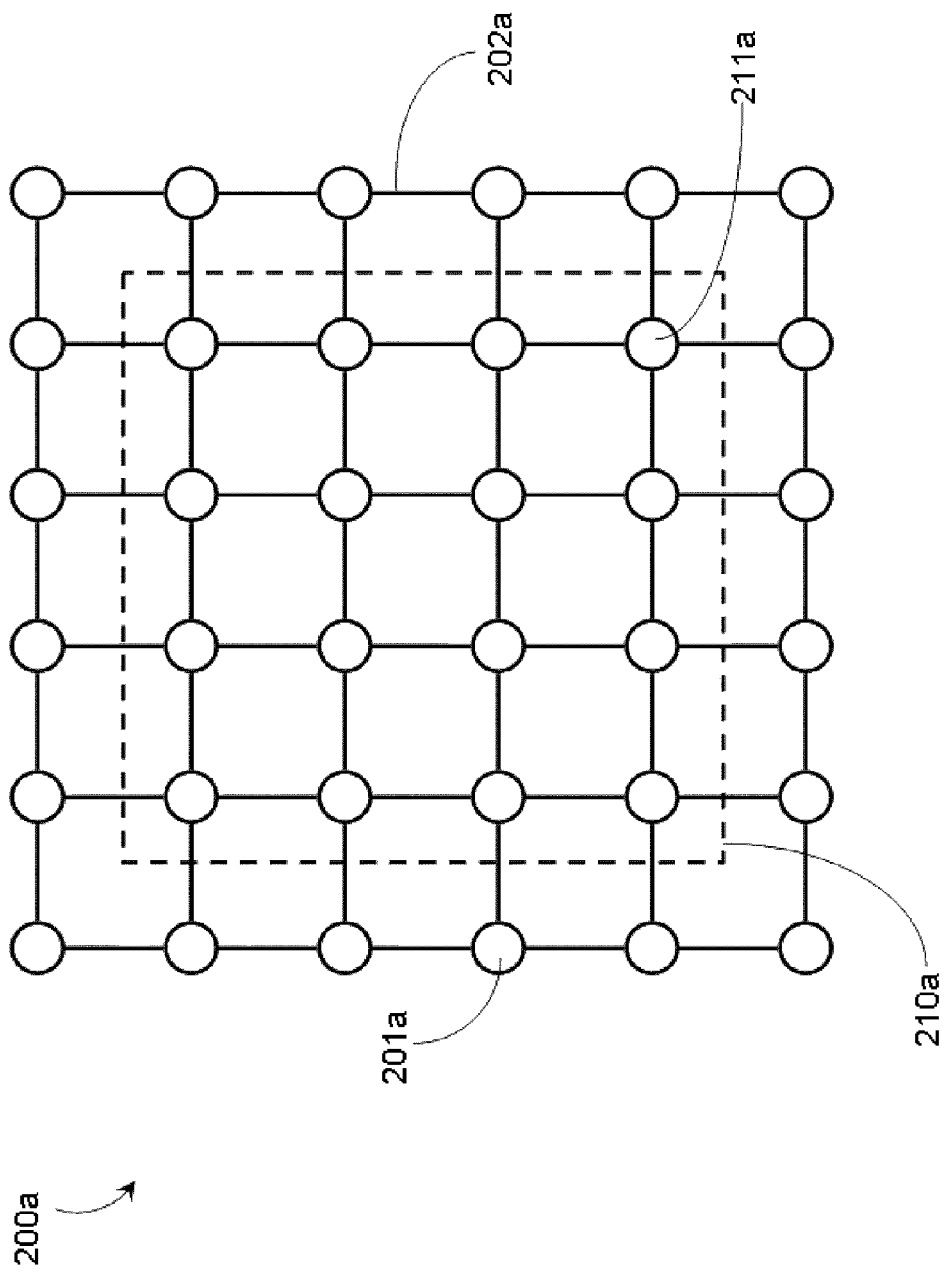
FIG. 2A is an illustrative representation of a homogeneous architecture for a lattice-based quantum processor.

While the present systems and devices describe heterogeneous architectures for quantum processors, it is acknowledged that some known architectures for quantum processors inherently incorporate qubits of differing connectivity. For example, the lattice topologies with nearest-neighbor coupling that are described in US Patent Publication No. 2006-0225165, US Patent Publication 2008-0176750, and U.S. patent application Ser. No. 12/266,378 generally incorporate homogeneous connectivity except around the perimeter. FIG. 2A is an illustrative representation of a homogeneous architecture for a lattice-based quantum processor 200a. Processor 200a includes thirty-six qubits (collectively 201a and 211a, only two called out in the Figure), where each qubit is configured to couple, by a respective coupler (collectively 202a, only one called out in the Figure) to its nearest neighbors in the lattice. In such architectures, qubits located around the perimeter (i.e., "perimeter qubits" collectively represented by qubit 201a positioned outside of broken-line box 210a) may be configured to couple to fewer other qubits than "internal qubits" (collectively represented by qubit 211a positioned inside broken-line box 210a) which are located within the interior of the coupling architecture and are not located around the perimeter. However, such architectures are still considered "homogeneous" because a uniform pattern of connectivity is applied to all qubits not located around the perimeter. Perimeter qubits 201a only have lower connectivity in these designs because they neighbor fewer qubits, and not as a tool to influence the quantum/classical behavior of the qubits and/or realize the benefits of a small-world network. In these designs, internal qubits 211a all have the same uniform connectivity (connectivity of four in the illustrated embodiment). The concepts taught herein may be applied to such a lattice to produce lattice-based quantum processor architectures similar to those shown in FIG. 2B and FIG. 2C.

Figure 2B:
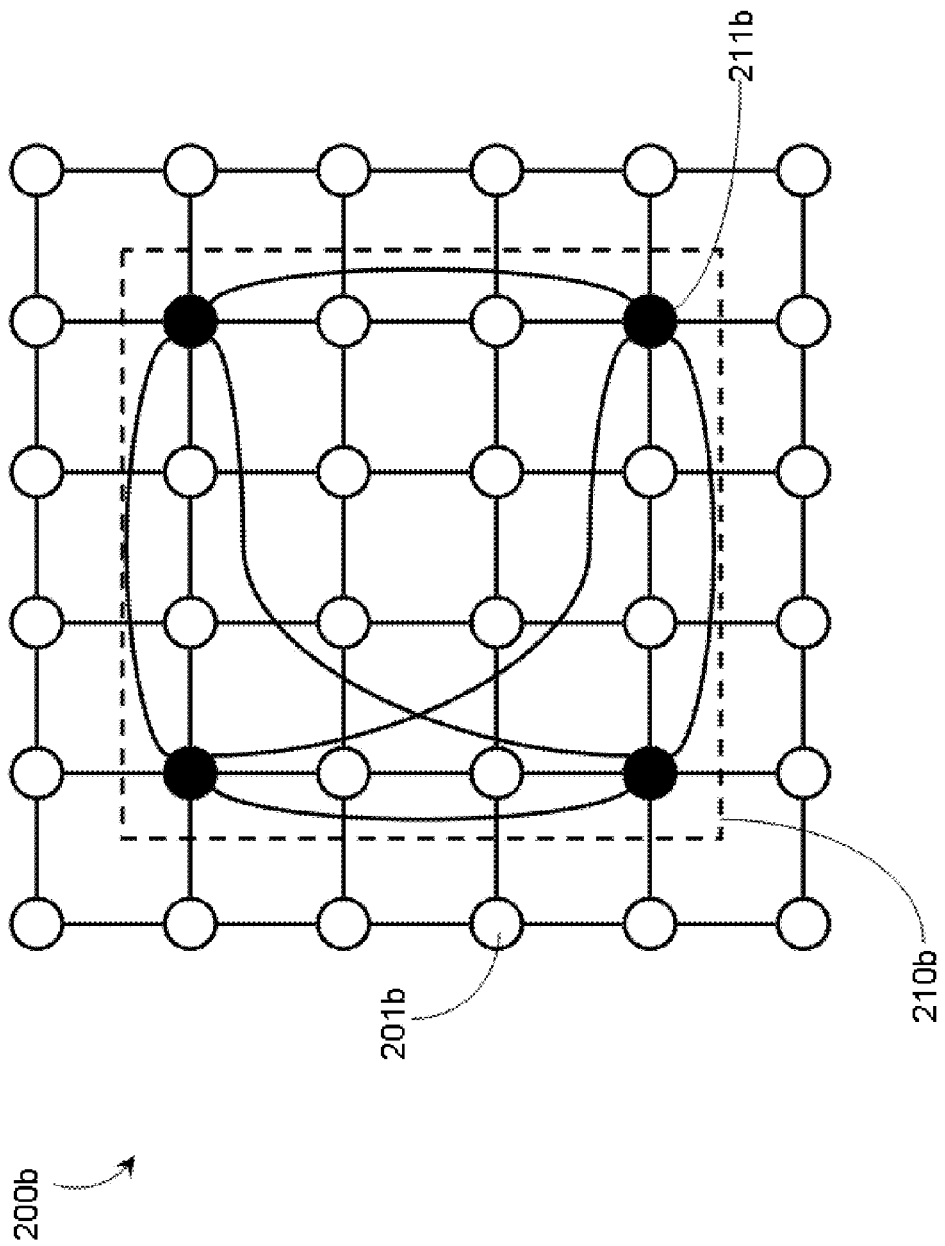
FIG. 2B is an illustrative representation of an embodiment of a heterogeneous architecture for a lattice-based quantum processor.

FIG. 2B is an illustrative representation of an embodiment of a heterogeneous architecture for a lattice-based quantum processor 200b. Processor 200b includes thirty-six qubits (collectively 201b and 211b, only two called out in the Figure) arranged in a similar square-lattice pattern to that shown in FIG. 2A. Processor 200b is similar to processor 200a from FIG. 2A in that it includes a set of twenty perimeter qubits (collectively 201b, each positioned outside of broken-line box 210b) and sixteen internal qubits (collectively 211b, each positioned inside of broken-line box 210b). Each qubit 201b, 211b in processor 200b is coupled to its nearest neighbors. However, four non-adjacent internal qubits (shown as black circles in the Figure) are also coupled to one another to realize a small-world network effect. In processor 200b, qubits illustrated as white circles may behave quantum mechanically, while qubits that are illustrated as black circles may behave more classically due to their high level of connectivity.

Figure 2C:
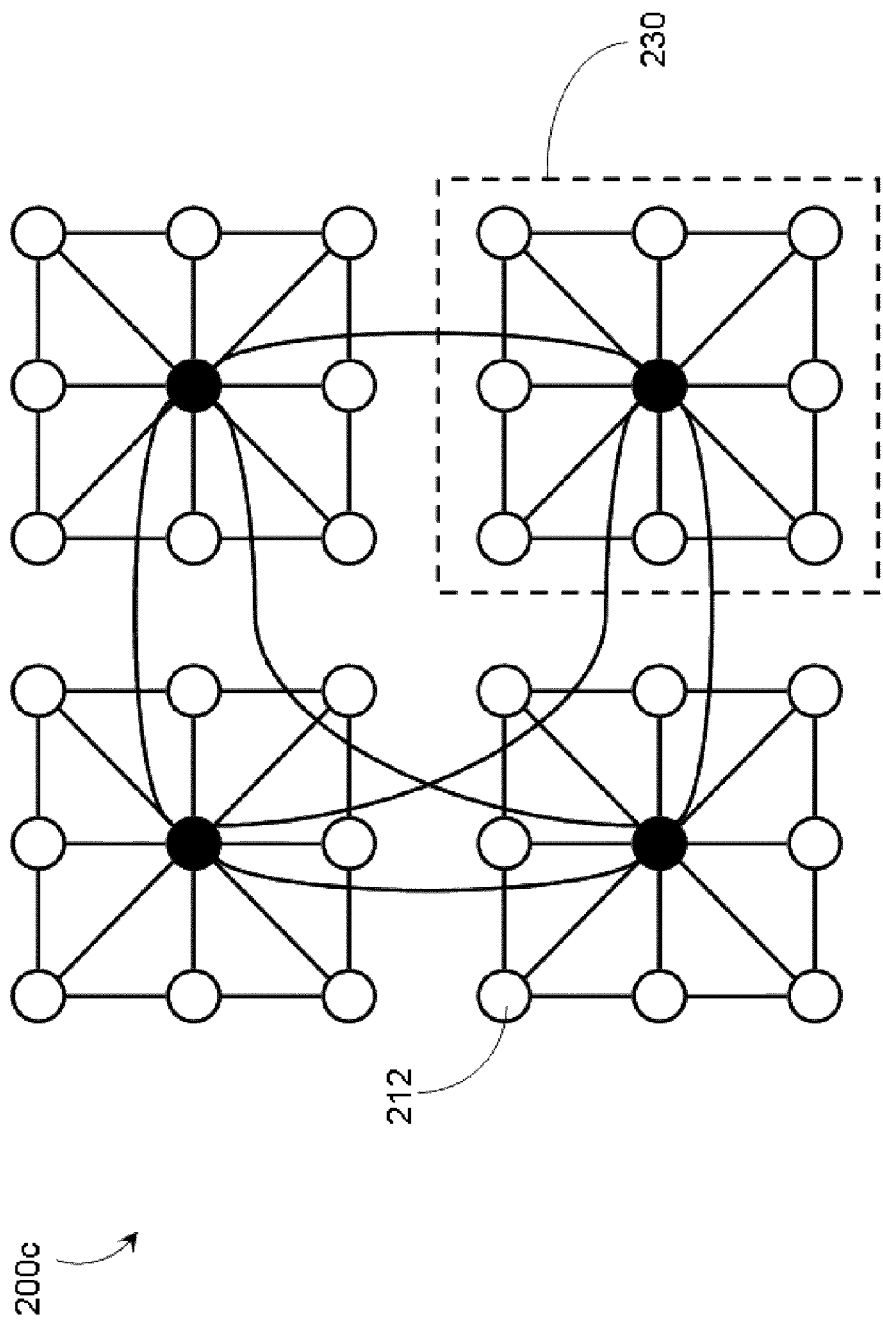
FIG. 2C is an illustrative representation of another embodiment of a heterogeneous architecture for a lattice-based quantum processor.

FIG. 2C is an illustrative representation of another embodiment of a heterogeneous architecture for a lattice-based quantum processor 200c. Processor 200c includes thirty-six qubits (collectively 212, only one called out in the Figure) arranged in a similar square-lattice pattern to that shown in FIGS. 2A and 2B. However, processor 200c is designed to further reduce the connectivity of the "low-connectivity" qubits (shown as white circles in the Figure). Those qubits that are illustrated as white circles have a connectivity of three and may behave quantum mechanically. However, four of the thirty-six qubits, illustrated as black circles, have a connectivity of eleven. Each of the qubits illustrated as black circles may behave more like a classical device, but including these qubits (i.e., qubits illustrated as black circles) allows each of qubits 212 (i.e., regardless of their individual connectivity) to be reached by no more than three coupling steps from any other qubit 212.

Processor 200c provides a clustered architecture that includes a small proportion of qubits whose connectivity is relatively high. These qubits are illustrated as black circles in FIG. 2C, and may behave more like classical bits than qubits. Each qubit illustrated as a black circle in FIG. 2C is coupled to a respective cluster 230 (only one called out in the Figure) of qubits illustrated as white circles, and all of the qubits illustrated as black circles are also coupled to each other. In this way, every qubit 212 in the architecture may communicate with any other qubit 212 through a relatively small number of coupling steps, while the qubits illustrated as white circles realize relatively low connectivity (three) and the qubits illustrated as black circles realize relatively high connectivity (eleven).

Those of skill in the art will appreciate that the principles taught herein may be applied over a wide variety of quantum processor architectures, not just the exemplary quantum processors provided in FIGS. 1A-2C herein. In accordance with the present systems and devices, a heterogeneous quantum processor architecture is one where certain qubits are specifically designed to have high connectivity, to the point where they may in fact behave like classical bits, to allow any qubit to communicably couple to any other qubit through a smaller number of coupling steps. In some embodiments, such a heterogeneous quantum processor architecture may effectively realize a small-world network in the network of interconnected qubits. While the embodiments illustrated in FIGS. 2B and 2C implement only "internal qubits" as "high-connectivity qubits," alternative embodiments may implement at least one "perimeter qubit" as a "high-connectivity qubit."

In accordance with the present systems and devices, a method for increasing the connectivity of the qubits in a quantum processor while limiting the overall susceptibility to noise of the qubits is described.

Figure 3:
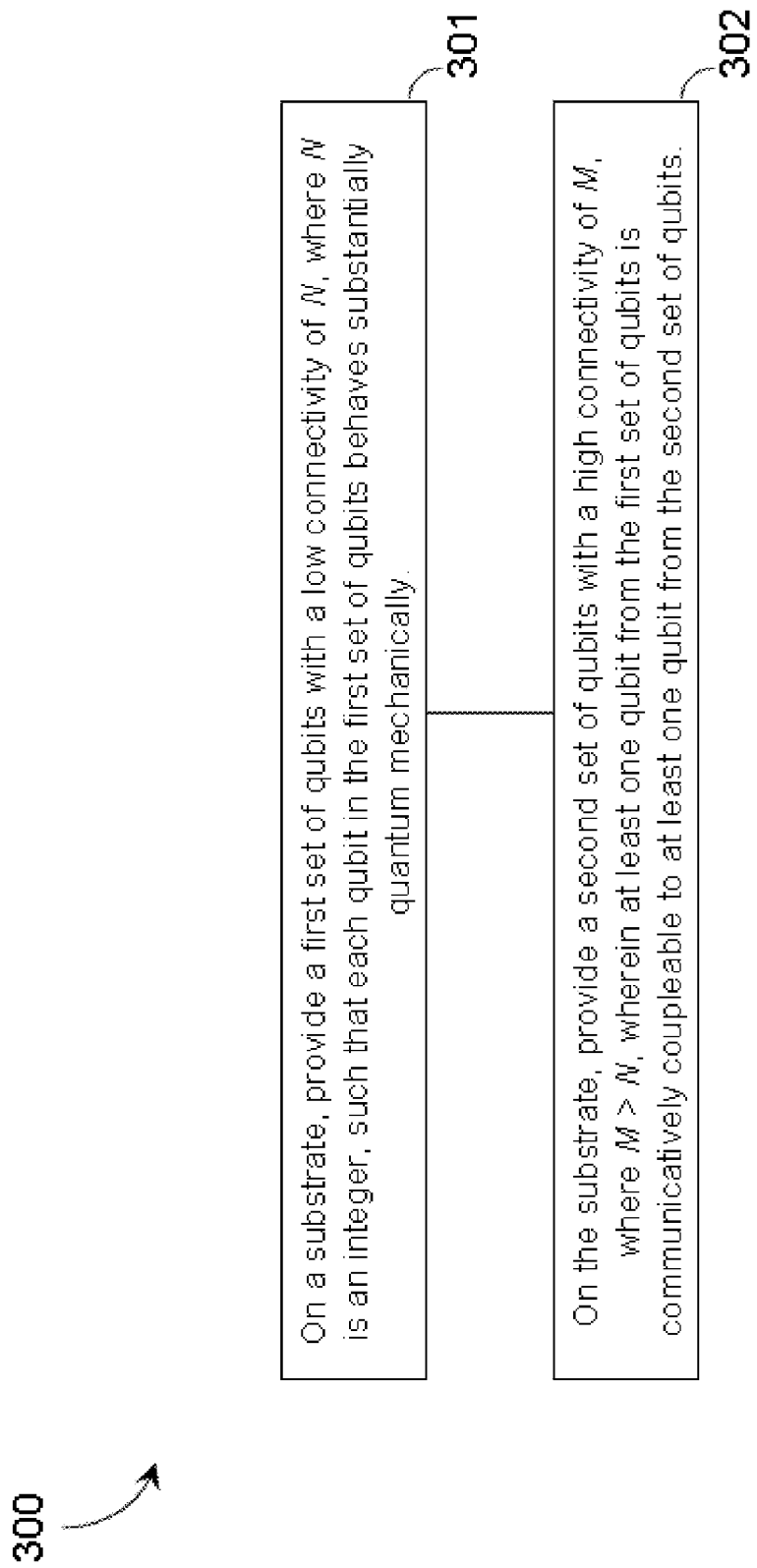
FIG. 3 is a flow-diagram of an embodiment of a method for increasing the connectivity of the qubits in a quantum processor while limiting the overall susceptibility to noise of the qubits.

FIG. 3 is a flow-diagram of an embodiment of this method 300 according to one illustrated embodiment.

At 301, a first set of qubits is provided on a substrate, the qubits of the first set having a relatively low connectivity of N, where N is an integer, such that each qubit in the first set of qubits will behave substantially quantum mechanically during use. In some embodiments, providing the first set of qubits includes forming, defining or configuring each qubit in the first set on the substrate with a relatively limited set of communicative paths (i.e., without coupling through intervening qubits) to other qubits. For example, the qubits of the first set may have on the order of two to five communicative paths to other qubits without any intervening qubits. The connectivity may advantageously be an integer, for instance two or four. The forming, defining or configuring may include one or more manufacturing operations, for example depositing and/or etching, for instance vapor-deposition or chemical deposition. In some embodiments, providing the first set may include positioning respective pairs of qubits sufficiently close or proximate one another to provide communicative paths therebetween, while positioning other respective pairs of qubits sufficiently far from one another to preclude or omit communicative paths (i.e., without coupling through intervening qubits) therebetween. In some embodiments, providing the first set may include providing (e.g., forming, defining or configuring) coupling structures (e.g., couplers) between respective pairs of qubits to provide communicative paths therebetween, while omitting or disabling coupling structures between other respective pairs of qubits to preclude or omit communicative paths therebetween.

At 302, a second set of qubits is provided on the substrate, the qubits of the second set having a relatively high connectivity of M, where M>N, such that the average number of intermediate coupling steps between any two qubits on the substrate is reduced. At least one qubit from the first set of qubits may be communicatively coupleable to at least one qubit from the second set of qubits. In some embodiments, providing the second set of qubits includes forming, defining or configuring each qubit in the second set on the substrate with a relatively high or large set of communicative paths (i.e., without coupling through intervening qubits) to other qubits. For example, the qubits of the second set may have on the order of greater than or equal to about four communicative paths to other qubits without intervening qubits, but in any case greater than that of the qubits of the first set. The forming, defining or configuring may include one or more manufacturing operations, for example depositing and/or etching, for instance vapor-deposition or chemical deposition. In some embodiments, providing the second set may include positioning respective pairs of qubits sufficiently close or proximate one another to provide communicative paths therebetween, while positioning other respective pairs of qubits sufficiently far from one another to preclude or omit communicative paths (i.e., without coupling through intervening qubits) therebetween. In some embodiments, providing the second set may include providing (e.g., forming, defining or configuring) coupling structures (e.g., couplers) between respective pairs of qubits to provide communicative paths therebetween, while omitting or disabling coupling structures between other respective pairs of qubits to preclude or omit communicative paths therebetween.

Some embodiments may provide the first set of qubits before the second set of qubits, while other embodiments provide the second set of qubits before the first set of qubits, and still other embodiments provide the first and second sets of qubits concurrently or in a mixed fashion.

As previously described, this heterogeneous qubit-coupling architecture may reduce the average number of intermediate coupling steps that separate any two qubits in a quantum processor, while limiting the overall susceptibility to noise of the qubits. The heterogeneous qubit-coupling architecture established by method 300 may, in some embodiments, effectively realize a small-world network where the average qubit has a low connectivity (thereby allowing it to operate substantially quantum mechanically) but each qubit is within a relatively low number of intermediate coupling steps from any other qubit.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems and devices for quantum processors, not necessarily the exemplary systems and devices for quantum processors generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 61/061,333, filed Jun. 13, 2008 and entitled "Systems and Devices for Quantum Processor Architectures," US Patent Publication No. 2006-0225165, US Patent Publication 2008-0176750, U.S. patent application Ser. No. 12/266,378, and PCT Patent Application Serial No. PCT/US09/37984 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A quantum processor, comprising:
   a plurality of qubits arranged on a surface of a substrate, each of the qubits in the plurality of qubits communicatively coupleable to at least one other qubit in the plurality of qubits, where:
   a number of outermost ones of the plurality of qubits form a perimeter of the plurality of qubits, and
   a number of inner ones of the plurality of qubits form an interior of the plurality of qubits, the inner ones of the plurality of qubits spaced inwardly from the outermost ones of the plurality of qubits,
   a first set of the number of inner ones of the plurality of qubits having a first connectivity, and
   a second set of the number of inner ones of the plurality of qubits having a second connectivity, the second connectivity greater than the first connectivity.

2. The quantum processor of claim 1 wherein the first connectivity is sufficiently low that at least some of the qubits of the first set of the number of inner ones of the qubits operate substantially quantum mechanically, wherein the first and second connectivity each comprises a maximum number of possible communicative paths that are available, whether active or not.

3. The quantum processor of claim 2 wherein the second connectivity is sufficiently high that at least some of the qubits of the second set of the number of inner ones of the qubits operate substantially classically.

4. The quantum processor of claim 1, further comprising:
   a plurality of couplers, each of the couplers operable to couple respective pairs of the qubits.

5. The quantum processor of claim 1 wherein respective pairs of the qubits are spaced with respect to one another to provide communicative coupling therebetween without the use of a coupler.

6. The quantum processor of claim 1 wherein the quantum processor is a superconducting quantum processor and at least one qubit is selected from the group consisting of: a superconducting flux qubit, a superconducting phase qubit, a superconducting charge qubit, and a superconducting hybrid qubit.

7. The quantum processor of claim 1 wherein at least some of the plurality of qubits form a small-world network.

8. The quantum processor of claim 1, further comprising:
   an additional plurality of qubits arranged on the surface of the substrate, at least one of the qubits of the additional plurality of qubits spaced outwardly from an outermost one of the plurality of qubits.

9. The quantum processor of claim 8 wherein at least one qubit from the additional plurality of qubits has a connectivity that is greater than the first connectivity.

10. A method of providing a quantum processor, the method comprising:
    providing on a surface of a substrate a first set of qubits with a low connectivity N that is an integer, where each qubit in the first set of qubits is spaced inwardly of an outermost perimeter set of qubits and behaves substantially quantum mechanically; and
    providing on the surface of the substrate a second set of qubits with a high connectivity M that is greater than the low connectivity N of the qubits of the first set of qubits, wherein at least one qubit from the first set of qubits is communicatively coupleable to at least one qubit from the second set of qubits, wherein the first connectivity N and second connectivity M each comprises a maximum number of possible communicative paths that are available, whether active or not.

11. The method of claim 10 wherein providing on a surface of a substrate a first set of qubits with a low connectivity includes, for each qubit in the first set of qubits, providing couplers between the qubit and a set of at most N other qubits.

12. The method of claim 11 wherein providing on the surface of the substrate a second set of qubits with a high connectivity includes, for each qubit in the second set of qubits, providing couplers between the qubit and a set of at least M other qubits.

13. The method of claim 10 wherein providing a first set of qubits with a low connectivity includes, for each qubit in the first set of qubits, spacing a set of N other qubits sufficiently proximate the qubit to communicatively couple therewith.

14. The method of claim 13 wherein providing a second set of qubits with a high connectivity includes, for each qubit in the second set of qubits, spacing a set of M other qubits sufficiently proximate the qubit to communicatively couple therewith.

15. The quantum processor of claim 1, further comprising:
an additional plurality of qubits arranged on an additional surface, wherein at least one qubit from the additional plurality of qubits arranged on the additional surface is communicatively coupleable to at least one qubit from the plurality of qubits arranged on the surface of the substrate.

16. The quantum processor of claim 15 wherein at least one qubit from the additional plurality of qubits has a connectivity that is greater than the first connectivity.

17. A quantum processor comprising:
a plurality of qubits including a first set of qubits and a second set of qubits, each qubit in the second set of qubits communicatively coupleable to at least two qubits in the first set of qubits, wherein
the first set of qubits has a first connectivity N, and the second set of qubits has a second connectivity M, where M>N, and wherein the first connectivity N alone provides a first average number of intermediate coupling steps between any two qubits in the plurality of qubits, and the first connectivity N combined with the second connectivity M provides a second average number of intermediate coupling steps between any two qubits in the plurality of qubits that is less than the first average number of intermediate coupling steps between any two qubits in the plurality of qubits, wherein the first connectivity N and second connectivity M each comprises a maximum number of possible communicative paths that are available, whether active or not.

18. The quantum processor of claim 17, further comprising:
a plurality of couplers, each of the couplers operable to couple respective pairs of the qubits.

19. The quantum processor of claim 17 wherein the quantum processor is a superconducting quantum processor and at least one qubit is selected from the group consisting of: a superconducting flux qubit, a superconducting phase qubit, a superconducting charge qubit, and a superconducting hybrid qubit.

* * * * *

UNITED STATES PATENT AND TRADEMARK OFFICE
CERTIFICATE OF CORRECTION

| | | |
|---|---|---|
| PATENT NO. | : 8,063,657 B2 | Page 1 of 1 |
| APPLICATION NO. | : 12/483971 | |
| DATED | : November 22, 2011 | |
| INVENTOR(S) | : Geordie Rose | |

It is certified that error appears in the above-identified patent and that said Letters Patent is hereby corrected as shown below:

Column 14, Line 20:
"greater than the first connectivity." should read, --greater than the first connectivity, wherein the first and second connectivity each comprises a maximum number of possible communicative paths that are available, whether active or not.--.

Column 14, Lines 24-27:
"substantially quantum mechanically, wherein the first and second connectivity each comprises a maximum number of possible communicative paths that are available, whether active or not." should read, --substantially quantum mechanically.--.

Column 16, Line 6:
"the first set of qubits has a first connectivity N, and the" should read, --the first set of qubits has a first connectivity N and the--.

Signed and Sealed this
Eighth Day of May, 2012

David J. Kappos
*Director of the United States Patent and Trademark Office*